United States Patent
Inoue

(10) Patent No.: US 8,417,976 B2
(45) Date of Patent: Apr. 9, 2013

(54) IMAGE PROCESSING APPARATUS, COMMUNICATION SYSTEM, CONTROL METHOD THEREOF, AND STORAGE MEDIUM

(75) Inventor: Go Inoue, Fujisawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 419 days.

(21) Appl. No.: 12/720,575

(22) Filed: Mar. 9, 2010

(65) Prior Publication Data

US 2010/0235619 A1 Sep. 16, 2010

(30) Foreign Application Priority Data

Mar. 13, 2009 (JP) .................. 2009-060684

(51) Int. Cl.
G06F 21/00 (2006.01)
(52) U.S. Cl. .............. 713/320; 726/6; 726/36; 713/150; 713/151; 713/323; 380/28; 455/127.5; 705/50; 709/224
(58) Field of Classification Search .................. 713/151, 713/320
See application file for complete search history.

(56) References Cited

U.S. PATENT DOCUMENTS

| 7,496,084 B2 * | 2/2009 | Inoue et al. ................. 370/349 |
| 2003/0081783 A1 * | 5/2003 | Adusumilli et al. .......... 380/270 |
| 2005/0198490 A1 * | 9/2005 | Jaganathan et al. .......... 713/151 |
| 2006/0236143 A1 * | 10/2006 | Kidoguchi .................... 713/320 |
| 2007/0182998 A1 * | 8/2007 | Okada ........................... 358/400 |
| 2008/0133953 A1 * | 6/2008 | Kawaji ......................... 713/322 |
| 2008/0215724 A1 * | 9/2008 | Kezuka et al. ............... 709/224 |
| 2009/0070607 A1 * | 3/2009 | Safford et al. ............... 713/320 |
| 2009/0172443 A1 * | 7/2009 | Rothman et al. ............. 713/323 |
| 2010/0165897 A1 * | 7/2010 | Sood ............................. 370/311 |

FOREIGN PATENT DOCUMENTS

JP 2006-259906 A 9/2006

OTHER PUBLICATIONS

Ye et al., "Medium Access Control With Coordinated Adaptive Sleeping for Wireless Sensor Networks", IEEE/ACM Transactions on Networking, vol. 12, No. 3, Jun. 2004.*

* cited by examiner

Primary Examiner — Morshed Mehedi
(74) Attorney, Agent, or Firm — Canon U.S.A., Inc. IP Division

(57) ABSTRACT

An apparatus connected to a network via a network interface device and capable of executing encrypted communication with an external device on the network requests that a first algorithm to be used in the encrypted communication with the external device is changed to a second algorithm included in the network interface device when the apparatus detects that a condition for shifting to a power saving mode, in which power consumption is smaller than that in a normal power mode, is satisfied while the apparatus is operated in the normal power mode.

20 Claims, 12 Drawing Sheets

FIG.7

| sort | length | name | pattern |
|---|---|---|---|
| IP | 1 | version | 4 |
| | 1 | service field | 0 |
| | 2 | total length | Don't care |
| | 2 | identification | Don't care |
| | 1 | flags | 0 |
| | 1 | offset | 0 |
| | 1 | ttl | Don't care |
| | 1 | protocol | UDP |
| | 2 | checksum | Don't care |
| | 4 | source addr | Don't care |
| | 4 | dst addr | own IPv4 addr |
| UDP | 2 | source port | Don't care |
| | 2 | dst port | 161 |
| | 2 | length | Don't care |
| | 2 | checksum | Don't care |
| SNMP | 1 | version | Don't care |
| | 6 | community | public |
| | 4 | data | get request |
| | 1 | request ID | 92 |
| | 1 | error status | 0 |
| | 1 | error index | 0 |
| | 11 | name | mid-2.25.3.2.1.5.1 |

FIG.8

| sort | length | name | pattern |
|---|---|---|---|
| IP | 1 | version | 4 |
| | 1 | service field | 0 |
| | 2 | total length | calculate |
| | 2 | identification | calculate |
| | 1 | flags | 0 |
| | 1 | offset | 0 |
| | 1 | ttl | 128 |
| | 1 | protocol | UDP |
| | 2 | checksum | calculate |
| | 4 | source addr | own IPv4 addr |
| | 4 | dst addr | calculate |
| UDP | 2 | source port | 161 |
| | 2 | dst port | calculate |
| | 2 | length | calculate |
| | 2 | checksum | calculate |
| SNMP | 1 | version | calculate |
| | 6 | community | public |
| | 4 | data | get request |
| | 1 | request ID | 92 |
| | 1 | error status | 0 |
| | 1 | error index | 0 |
| | 11 | name | mid-2.25.3.2.1.5.1 |
| | 1 | value | 2 |

FIG.9

| No | TRANSMISSION SOURCE ADDRESS | DESTINATION ADDRESS | TRANSMISSION SOURCE PORT | DESTINATION PORT | ENCRYPTION ALGORITHM | AUTHENTICATION ALGORITHM | PRIOR SHARED KEY |
|---|---|---|---|---|---|---|---|
| 1 | 192.168.0.1 | ANY | ANY | 80 | ANY | SHA1/MD5 | hoge |
| 2 | ANY | 192.168.0.1 | 80 | ANY | ANY | SHA1/MD5 | hoge |
| 3 | ANY | 192.168.0.2 | ANY | ANY | ANY | ANY | pass |
| 4 | 192.168.0.2 | ANY | ANY | ANY | ANY | ANY | pass |
| 5 | 192.168.0.5 | ANY | ANY | 515 | AES-CBC | ANY | word |
| 6 | ANY | 192.168.0.5 | 515 | ANY | AES-CBC | ANY | word |

FIG.10A

| No | TRANSMISSION SOURCE ADDRESS | DESTINATION ADDRESS | TRANSMISSION SOURCE PORT | DESTINATION PORT | ENCRYPTION ALGORITHM | AUTHENTICATION ALGORITHM | ENCRYPTION SHARED KEY | AUTHENTICATION SHARED KEY | SPI | SEQUENCE NUMBER | PERIOD OF VALIDITY | ELAPSED TIME | LIFE-DURATION BYTE |
|---|---|---|---|---|---|---|---|---|---|---|---|---|---|
| 1 | 192.168.0.1 | 192.168.0.100 | ANY | 80 | 3DES-CBC | SHA1 | abcdefgh | abcdefgh1234567890ab | ab34 | 1003 | 4hour | 1hour | 1MByte |
| 2 | 192.168.0.100 | 192.168.0.1 | 80 | ANY | | | | | | | | | |
| 3 | 192.168.0.100 | 192.168.0.2 | ANY | ANY | AES-GCM | SHA256 | abcdefgh12345678 | abcdefgh12345678 | 56bb | 876 | 20MByte | 2hour | 3MByte |
| 4 | 192.168.0.2 | 192.168.0.100 | ANY | ANY | | | | | | | | | |

FIG.10B

| No | TRANSMISSION SOURCE ADDRESS | DESTINATION ADDRESS | TRANSMISSION SOURCE PORT | DESTINATION PORT | ENCRYPTION ALGORITHM | AUTHENTICATION ALGORITHM | ENCRYPTION SHARED KEY | AUTHENTICATION SHARED KEY | SPI | SEQUENCE NUMBER | PERIOD OF VALIDITY | ELAPSED TIME | LIFE-DURATION BYTE |
|---|---|---|---|---|---|---|---|---|---|---|---|---|---|
| 1 | 192.168.0.1 | 192.168.0.100 | ANY | 80 | 3DES-CBC | SHA1 | abcdefgh | abcdefgh1234567890ab | ab34 | 1003 | 4hour | 1hour | 1MByte |
| 2 | 192.168.0.100 | 192.168.0.1 | 80 | ANY | | | | | | | | | |
| 3 | 192.168.0.100 | 192.168.0.2 | ANY | ANY | AES-CBC | SHA1 | 88888888aaabbb | 1234567890abcdefghij | 56bb | 3 | 20MByte | 0hour | 3MByte |
| 4 | 192.168.0.2 | 192.168.0.100 | ANY | ANY | | | | | | | | | |

FIG.10C

| No | TRANSMISSION SOURCE ADDRESS | DESTINATION ADDRESS | TRANSMISSION SOURCE PORT | DESTINATION PORT | ENCRYPTION ALGORITHM | AUTHENTICATION ALGORITHM | ENCRYPTION SHARED KEY | AUTHENTICATION SHARED KEY | SPI | SEQUENCE NUMBER | PERIOD OF VALIDITY | ELAPSED TIME | LIFE-DURATION BYTE |
|---|---|---|---|---|---|---|---|---|---|---|---|---|---|
| 1 | 192.168.0.1 | 192.168.0.100 | ANY | 80 | 3DES-CBC | SHA1 | abcdefgh | abcdefgh1234567890ab | ab34 | 1029 | 4hour | 2hour | 2MByte |
| 2 | 192.168.0.100 | 192.168.0.1 | 80 | ANY | | | | | | | | | |
| 3 | 192.168.0.100 | 192.168.0.2 | ANY | ANY | AES-CBC | SHA1 | 88888888aaabbb | 1234567890abcdefghij | 56bb | 100 | 20MByte | 1hour | 6MByte |
| 4 | 192.168.0.2 | 192.168.0.100 | ANY | ANY | | | | | | | | | |

FIG.10D

| No | TRANSMISSION SOURCE ADDRESS | DESTINATION ADDRESS | TRANSMISSION SOURCE PORT | DESTINATION PORT | ENCRYPTION ALGORITHM | AUTHENTICATION ALGORITHM | ENCRYPTION SHARED KEY | AUTHENTICATION SHARED KEY | SPI | SEQUENCE NUMBER | PERIOD OF VALIDITY | ELAPSED TIME | LIFE-DURATION BYTE |
|---|---|---|---|---|---|---|---|---|---|---|---|---|---|
| 1 | 192.168.0.1 | 192.168.0.100 | ANY | 80 | 3DES-CBC | SHA1 | abcdefgh | abcdefgh1234567890ab | ab34 | 1029 | 4hour | 2hour | 2MByte |
| 2 | 192.168.0.100 | 192.168.0.1 | 80 | ANY | | | | | | | | | |
| 3 | 192.168.0.100 | 192.168.0.2 | ANY | ANY | AES-GCM | SHA256 | hogehoge9765432 | ahhhaadj88886666 | 56bb | 2 | 20MByte | 0hour | 2MByte |
| 4 | 192.168.0.2 | 192.168.0.100 | ANY | ANY | | | | | | | | | |

FIG.11

Type: Change Clipher Spec
Proposal #1
  Proposal Number:    1
  Encryption-Algorithm: AES-CBC
  Key-Length:          128
  Hash-Algorithm:      SHA1
  Life-Type:            Byte
  Life-Duration:       20M
Proposal #2
  Proposal Number:    2
  Encryption-Algorithm: AES-CBC
  Key-Length:          128
  Hash-Algorithm:      MD5
  Life-Type:            Byte
  Life-Duration:       20M
Proposal #3
  Proposal Number:    3
  Encryption-Algorithm: 3DES-CBC
  Hash-Algorithm:      SHA1
  Life-Type:            Byte
  Life-Duration:       20M
Proposal #4
  Proposal Number:    4
  Encryption-Algorithm: 3DES-CBC
  Hash-Algorithm:      MD5
  Life-Type:            Byte
  Life-Duration:       20M

FIG.12

Type: Change Clipher Spec
Proposal #1
  Proposal Number:    1
  Encryption-Algorithm: AES-CBC
  Key-Length:         128
  Hash-Algorithm:     SHA1
  Life-Type:          Byte
  Life-Duration:      20M
Proposal #2
  Proposal Number:    2
  Encryption-Algorithm: AES-CBC
  Key-Length:         128
  Hash-Algorithm:     MD5
  Life-Type:          Byte
  Life-Duration:      20M

IMAGE PROCESSING APPARATUS, COMMUNICATION SYSTEM, CONTROL METHOD THEREOF, AND STORAGE MEDIUM

BACKGROUND OF THE INVENTION

1. Field of the Invention

The present invention relates to an information processing apparatus, which is connected to a network and can execute encrypted communication with an external device on the network.

2. Description of the Related Art

An information processing system with a power saving mode for suppressing power consumption, when the information processing system in a standby state, has been known. As one example of such the information processing system, there is a communication configured by an information processing apparatus on the main body side including a main central processing unit (CPU) and a network interface card (NIC) apparatus including a sub CPU.

In such the communication system, generally, the information processing apparatus on the main body side is shifted to a power saving mode, and each module on the NIC apparatus side, which is small in electric power consumption, stands by with normal electric power being supplied.

Further, in Japanese Patent Application Laid-Open No. 2006-259906, it is discussed that when the information processing apparatus is shifted to the power saving mode and electric power supply to the main CPU is stopped, the main CPU informs the sub CPU of the address of a multicast packet to be responded thereto.

This allows the sub CPU to respond instead of the main CPU when the multicast packet is received while the electric power supply to the main CPU stopped. Thus, it is not necessary to start the main CPU. In other words, this allows the electric power stop to the main CPU to be continued for a longer period of time. Thus, an electric power saving effect is enhanced.

Recently, in order to protect confidential information, as a technique for communicating with a network path encrypted, internet protocol security (IPSec), secure socket layer (SSL) or the like has been known. If these techniques are used, the confidential information can be transmitted and received via a network with data encrypted. Thus, leakage of information can be protected.

As described above, when the information processing apparatus on the main body side is shifted to the power saving mode, information about a packet to be responded thereto is registered with the NIC apparatus. Thus, the NIC apparatus can execute a response for a received packet instead of the information processing apparatus on the main body side. However, when the NIC apparatus responds as proxy of the information processing apparatus on the main body, if the packet to be transmitted via a network is encrypted, a response by the NIC apparatus may not successfully be executed in some cases.

More specifically, when the NIC apparatus responds instead of the information processing apparatus on the main body, a pattern of a packet to which the NIC apparatus is to respond and a packet to be transmitted as a response to a packet that matches the pattern are registered. Then, the NIC apparatus having received a packet that matches the registered pattern will transmit a packet corresponding to the pattern.

At this time, if a packet received by the NIC apparatus is encrypted, although the content of its packet matches the registered pattern, when a packer that remains encrypted and the registered pattern are compared, it is determined that these are not matched.

In this case, the information processing apparatus is to be returned on the main body from the power saving mode and transfer the packet received by the NIC apparatus to the information processing apparatus on the main body. Accordingly, the number of times in which the information processing apparatus on the main body is returned to the normal power mode is increased and an electric power saving effect is reduced.

Further, it is also considered that the NIC apparatus is provided with a configuration for executing encryption/decryption processing similar to the information processing apparatus on the main body. However, the hardware configuration of the NIC apparatus (processing capability of CPU and memory capacity) is usually more insufficient than that of the information processing apparatus on the main body. Thus, for example, when a plurality of algorithms for executing encrypted communication are present, it may be difficult to also provide the NIC apparatus with all of the plurality of algorithms to be included in the information processing apparatus on the main body.

Accordingly, when a session for encrypted communication using a specific algorithm between the information processing apparatus on the main body and an external device on a network is established, if the information processing apparatus on the main body is shifted to the power saving mode, a similar situation may arise. In other words, if the NIC apparatus does not include the above-described specific algorithm, a packet received by the NIC apparatus cannot be decrypted. Thus, pattern matching in the NIC apparatus is not successfully executed.

SUMMARY OF THE INVENTION

According to an aspect of the present invention, an apparatus includes a detection unit configured to detect that a condition for shifting to a power saving mode, in which power consumption is smaller than that in a normal power mode, is satisfied while the apparatus is operated in the normal power mode, and a request unit configured to request that a first algorithm to be used in an encrypted communication with an external device is changed to a second algorithm included in a network interface device when the condition is satisfied.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 7 illustrates one example of a received packet pattern to be registered with a proxy response pattern DB 214.

FIG. 8 illustrates one example of a transmitted packet to be registered with the proxy response pattern DB 214.

FIG. 9 illustrates security policy information to be stored in a security policy DB 202.

FIGS. 10A, 10B, 10C and 10D illustrate SA information registered with an encryption key information DB 211.

FIG. 11 illustrates one example of an algorithm change request packet to be transmitted by an encryption processing unit 209.

FIG. 12 illustrates one example of an algorithm change request packet to be transmitted by the encryption processing unit 209.

DESCRIPTION OF THE EMBODIMENTS

Various exemplary embodiments, features, and aspects of the invention will be described in detail below with reference to the drawings. The present invention is not limited to the following exemplary embodiments. Further, all combinations of characteristics illustrated in exemplary embodiments are not necessarily essential for the present invention.

Figure 1:
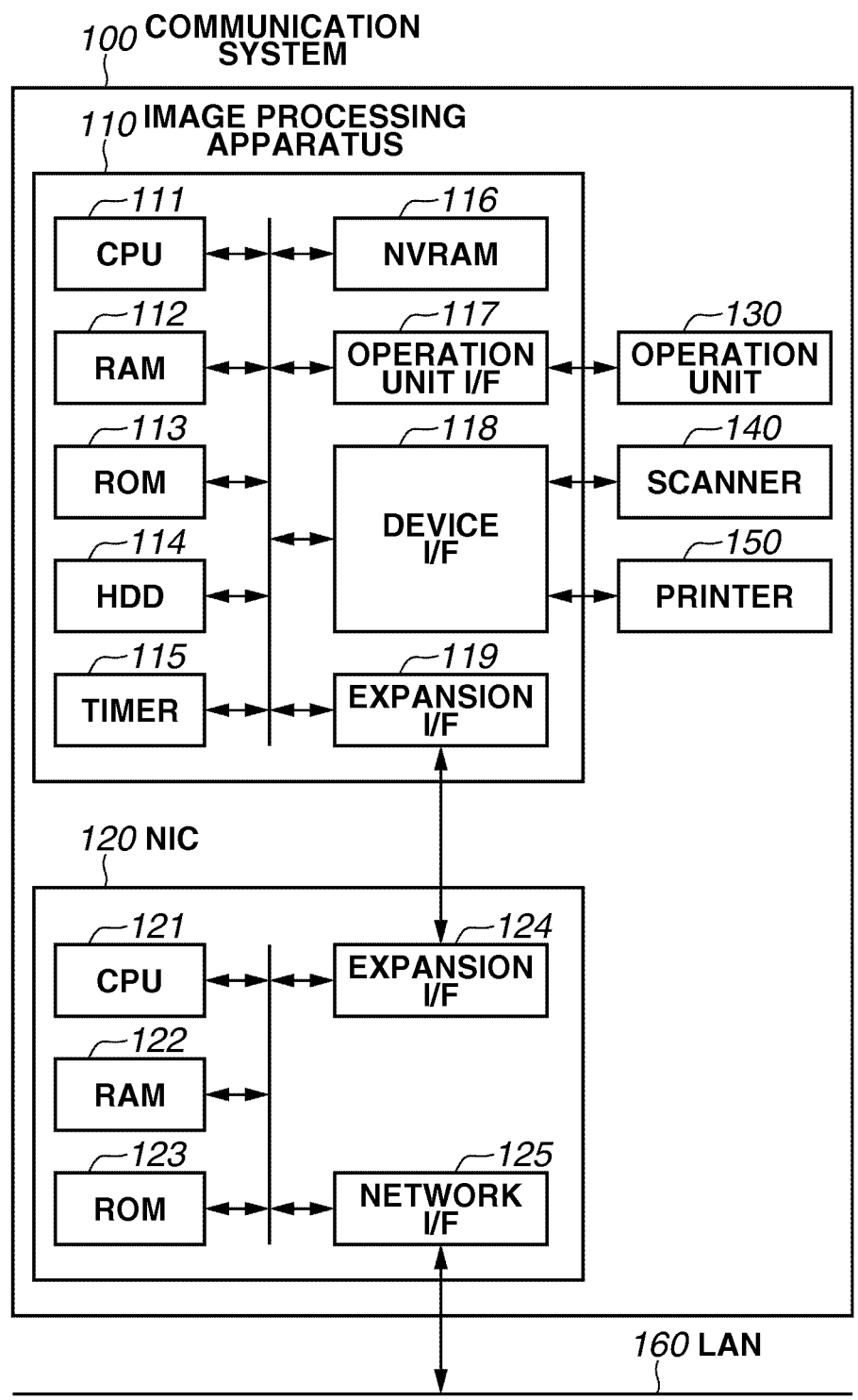
FIG. 1 is a block diagram illustrating a hardware configuration of a communication system 100.

FIG. 1 is a block diagram illustrating a hardware configuration of a communication system according to a first exemplary embodiment of the present invention. The communication system 100 includes an information processing apparatus 110 and an NIC 120. The information processing apparatus 110 is connected to a local area network (LAN) 160 via the NIC 120.

A central processing unit (CPU) 111 executes a software program for the information processing apparatus 110 to control the entire apparatus. A random access memory (RAM) 112 is used for temporary storage of data or the like when the CPU 111 controls the apparatus. A read only memory (ROM) 113 stores a boot program for the apparatus, a fixed parameter, and the like.

A hard disk drive (HDD) 114 is used for storing various types of data. A timer 115 executes management of elapsed time. A nonvolatile random access memory (NVRAM) 116 is a nonvolatile memory and is used to store various setting values for the information processing apparatus 110. An operation unit interface (I/F) 117 controls an operation unit 130, displays various types of operation screens on a liquid crystal panel provided on the operation unit 130, and also transmits instructions from a user input via an operation screen to the CPU 111.

A device I/F 118 controls a scanner 140 and a printer 150. The scanner 140 reads an image on a document to generate image data. The printer 150 prints an image based on image data on a recording medium. An expansion I/F 119 is connected with an expansion I/F 124 on the NIC 120 side to control data communication with an external device on the LAN 160.

A CPU 121 executes a software program for the NIC 120 to control the entire apparatus. A RAM 122 is a random access memory and is used for temporary storing data or the like when the CPU 121 controls the apparatus. A ROM 123 is a read only memory and stores a boot program of the apparatus, a fixed parameter, and the like.

The expansion I/F 124 is connected with the expansion I/F 119 on the information processing apparatus 110 side to control data communication between the information processing apparatus 110 and the NIC 120. A network I/F 125 is connected to the LAN 160 to control data communication between the NIC 120 (information processing apparatus 110, communication system 100) and an external device on the LAN 160.

The information processing apparatus 110 can switch between a normal power mode and a power saving mode in which the electric power consumption is smaller than that in the normal power mode. When the information processing apparatus 110 is shifted from the normal power mode to the power saving mode, electric power supply to the CPU 111, the HDD 114, the NVRAM 116, and the like are stopped.

On the other hand, the NIC 120 side is made of an application specific integrated circuit (ASIC) different from the information processing apparatus 110. Thus, even when the information processing apparatus 110 is shifted to the power saving mode, electric power supply is continued to the NIC 120 to realize a proxy response function, which will be described later.

Figure 2:
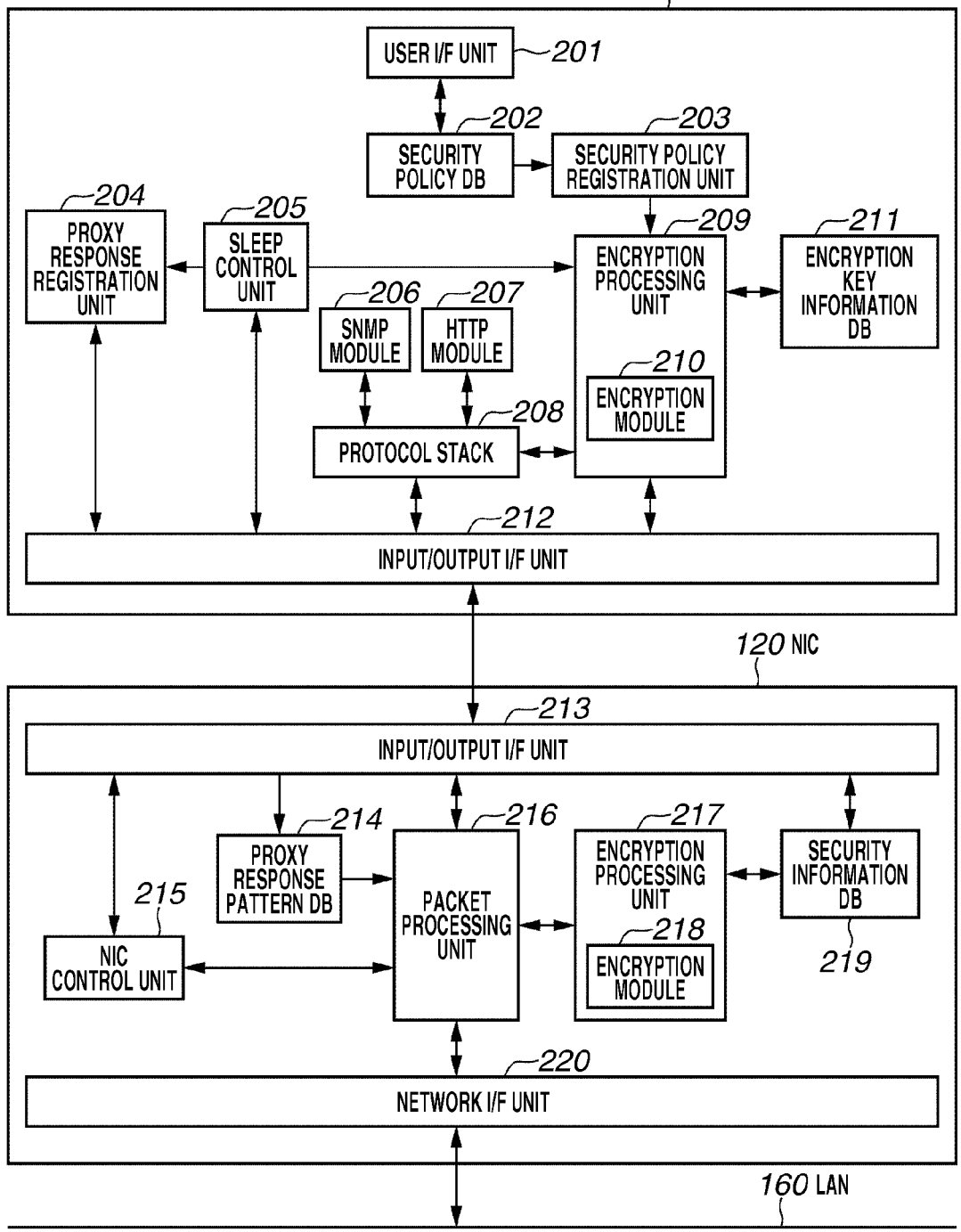
FIG. 2 illustrates a software configuration of the communication system 100.

FIG. 2 illustrates a software configuration of the communication system 100. The software configuration is also configured to be separated into the information processing apparatus 110 side and the NIC 120 side.

A network I/F unit 220 controls transmission and reception of a network packet via the LAN 160. A packet processing unit 216 executes processing of a packet that is transmitted and received via the LAN 160. An input/output I/F unit 213 executes transmission and reception of a packet and a command with the information processing apparatus 110.

An NIC control unit 215 manages a start and an operation state of the NIC 120. A proxy response pattern database (DB) 214 registers proxy response information (e.g., packet pattern) used to realize the proxy response function. An encryption processing unit 217 encrypts/decrypts a transmitted and received packet. The encryption processing unit 217 includes an encryption module unit 218 for storing encryption algorithm and authentication algorithm used to execute encryption/decryption processing. A security information DB 219 stores key information or the like used to execute encryption/decryption processing.

An input/output I/F unit 212 executes transmission and reception of a packet and a command with the NIC 120. A protocol stack 208 controls transmission and reception of a network packet. Above a protocol stack, various types of network protocols and applications are present. In the present exemplary embodiment, an example, which includes a simple network management protocol (SNMP) module 206 and a hyper text transfer protocol (HTTP) module 207, will be described.

An encryption processing unit 209 is a processing unit configured to hook into the protocol stack 208 to encrypt/decrypt a packet to be transmitted and received, and to store various types of encryption algorithm and authentication algorithm in an encryption module 210. An encryption key information DB 211 is a DB for storing security information to be dynamically generated. For example, the encryption key information DB 211 stores information to be dramatically changed such as shared key information and a period of validity determined in negotiations with an external device, encryption algorithm, and authentication algorithm.

On the other hand, a security policy DB 202 stores static setting information (security policy information) concerning how to communicate with which external device and how to communicate by which encryption algorithm. The security policy information can be changed to an arbitrary setting by a user via a user I/F unit 201.

A security policy registration unit 203 is a control unit configured to read setting information from the security policy DB 202 to reflect a setting on the encryption processing unit 209. A reflection of the setting may be executed only once when starting, or a reflection of the setting may also be executed whenever instructions for a change of the setting are received via the user I/F unit 201.

A proxy response registration unit 204 notifies the NIC 120 of a received packet pattern for specifying a packet to which the NIC 120 is to respond instead of the information processing apparatus 110 (as proxy of information processing apparatus 110), and the content of a transmission packet to be responded. Then the NIC 120 registers them. The notification may be executed only once when starting, or whenever instructions for a change of the setting are received via the user I/F unit 201.

A sleep control unit 205 controls the shift of the information processing apparatus 110 to the power saving mode and the return thereof to the normal power mode. Further, the sleep control unit 205 notifies the NIC 120 and the encryption processing unit 209 of the shift to the power saving mode in advance directly before the information processing apparatus 110 is shifted to the power saving mode.

Figure 3:
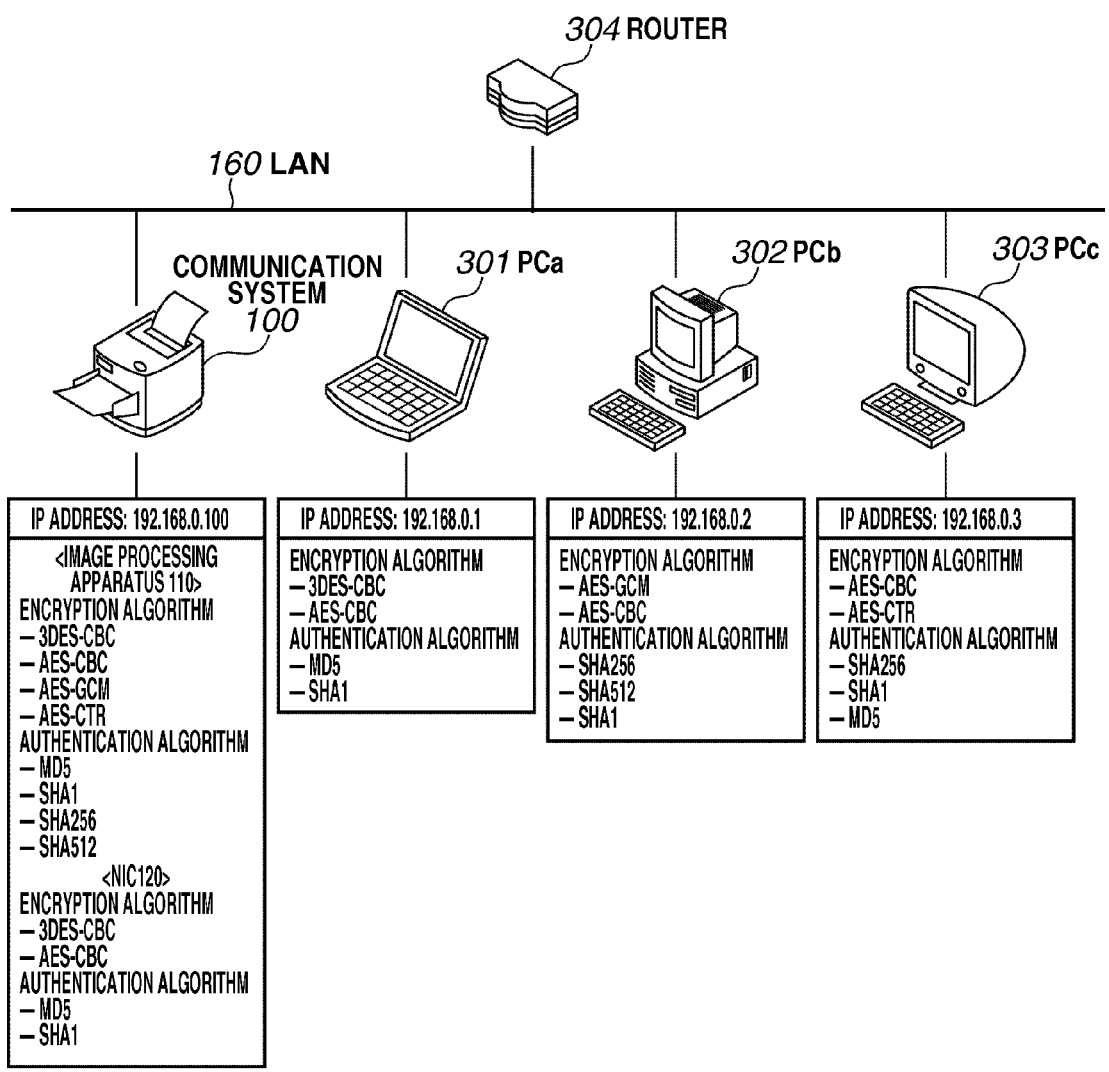
FIG. 3 illustrates a general view of a network including the communication system 100.

FIG. 3 illustrates a general view of a network including the communication system 100. In the present exemplary embodiment, as one example of encrypted communication, a case in which each device on the network can execute data communication using the IPsec will be described below. However, an encryption method is not limited to the IPsec but another method may be adopted.

The communication system 100 is communicably connected to a PCa 301, a PCb 302, a PCc 303, and a router 304 via the LAN 160. In FIG. 3, only devices present in the same link under the router 304 are illustrated. However, in a case in which the communication system 100 communicates with an external device connected to the communication system 100 via the router 304, the present invention can also similarly be applied thereto.

The communication system 100 including the information processing apparatus 110 and the NIC 120 is set with 192.168.0.100 as a common internet protocol (IP) address. This IP address may be given based on the internet protocol version 4 (IPv4) or internet protocol version 6 (IPv6). Encryption algorithms to be supported by the information processing apparatus 110 are triple data encryption standard-CBC (3 DES-CBC), advanced encryption standard-CBC (AES-CBC), advanced encryption standard-GCM (AES-GCM), and advanced encryption standard-CTR (AES-CTR). Further, authentication algorithms to be supported by the information processing apparatus 110 are message digest algorithm 5 (MD 5), secure hash algorithm 1 (SHA 1), secure hash algorithm 256 (SHA 256), and secure hash algorithm 512 (SHA 512).

On the other hand, encryption algorithms to be supported by the NIC 120 are 3 DES-CBC and AES-CBC. Further, authentication algorithms to be supported by the NIC 120 are MD 5 and SHA 1.

The PCa 301 is set with 192.168.0.1 as an IP address. Encryption algorithms to be supported by the PCa 301 is 3 DES-CBC and AES-CBC. Authentication algorithms are MD 5 and SHA 1. The PCb 302 is set with 192.168.0.2 as an IP address. Encryption algorithms to be supported by the PCb 302 are AES-GCM and AES-CBC. Authentication algorithms are SHA 256, SHA 512, and SHA 1.

The PCc 303 is set with 192.168.0.5 as an IP address. Encryption algorithms to be supported by the PCc 303 are AES-CBC and AES-CTR. Authentication algorithms are SHA 256, SHA 1, and MD 5.

Figure 4:
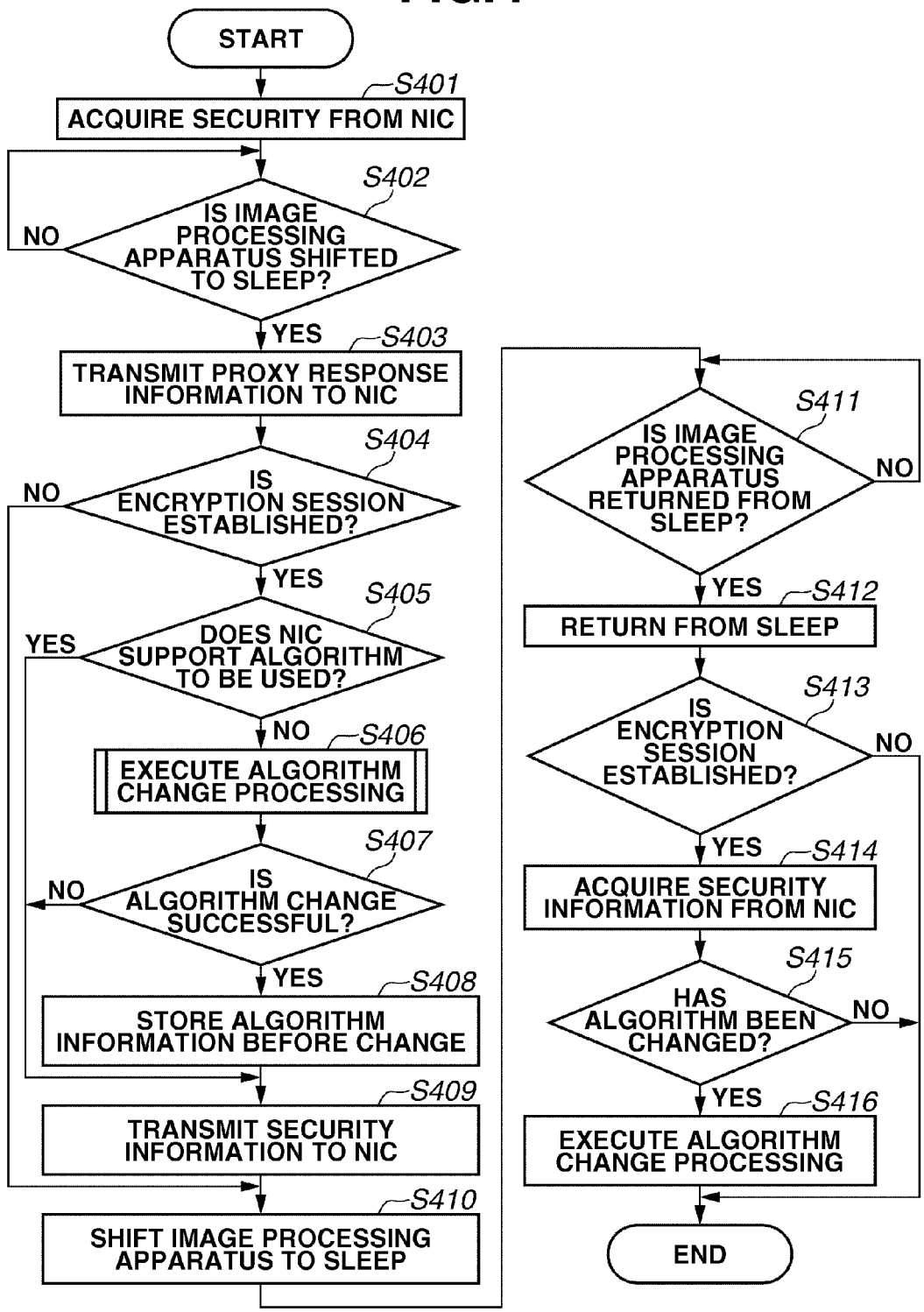
FIG. 4 is a flowchart illustrating an operation of an information processing apparatus 110.
Figure 5:
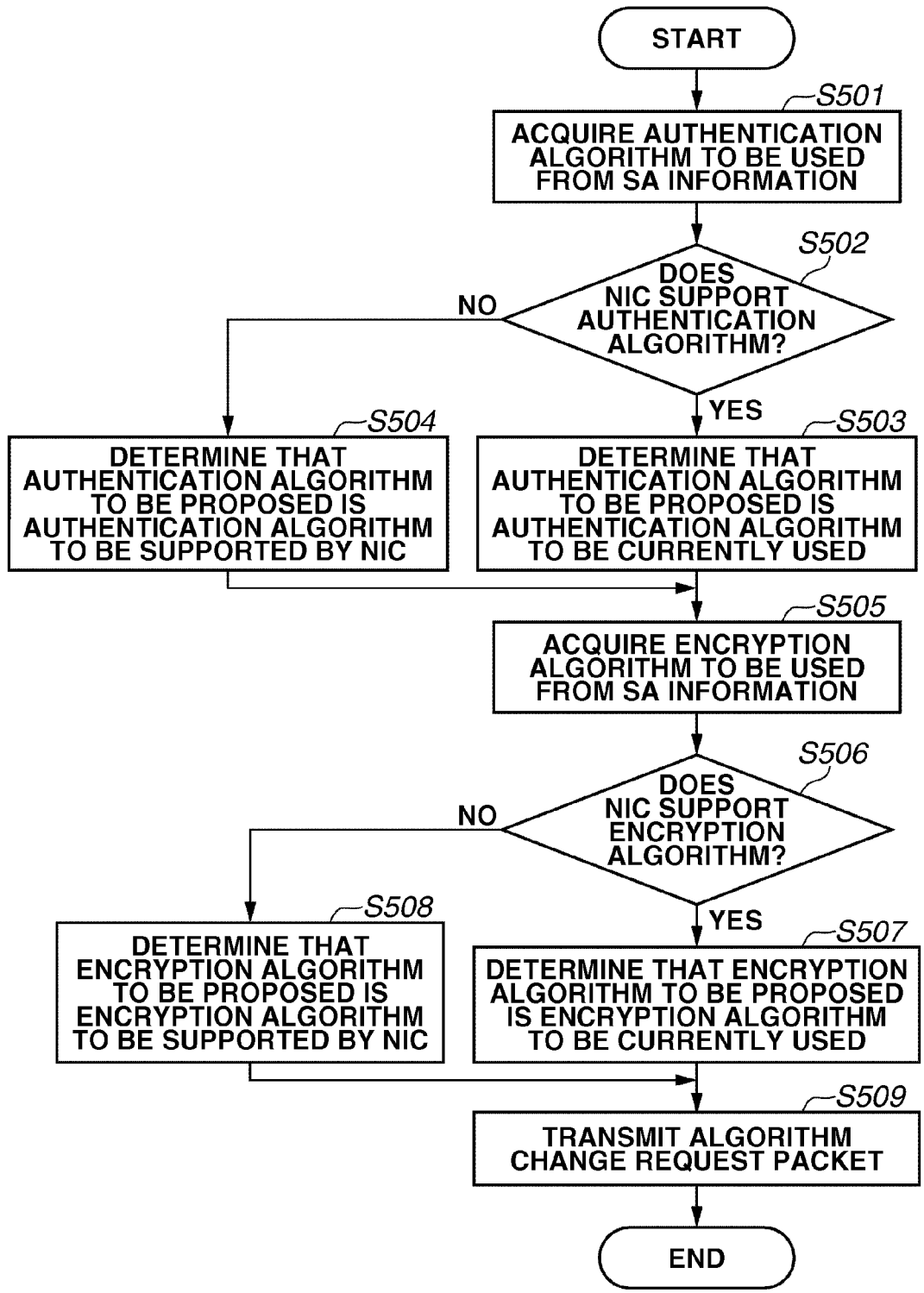
FIG. 5 is a flowchart illustrating an operation of the information processing apparatus 110.
Figure 6:
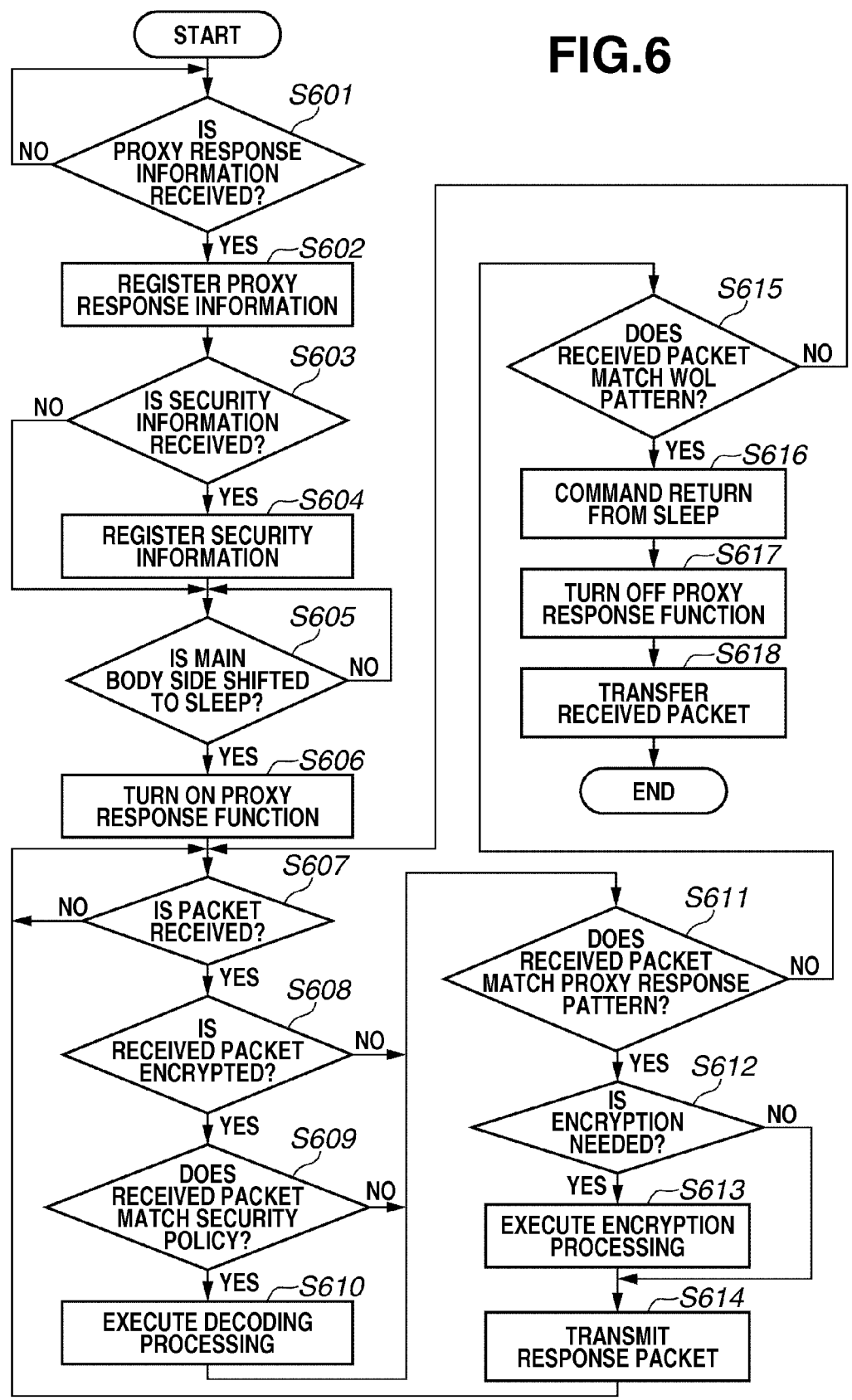
FIG. 6 is a flowchart illustrating an operation of an NIC 120.

FIGS. 4 to 6 are flowcharts illustrating processing for changing algorithm to be used in encrypted communication with an external device when the information processing apparatus 100 is shifted to the power saving mode while a session for executing encrypted communication with the external device is established.

Each operation (step) illustrated in flowcharts in FIGS. 4 and 5 is realized by the CPU 111 on the information processing apparatus 110 by executing a control program. Further, each operation (step) illustrated in a flowchart in FIG. 6 is realized by the CPU 121 on the NIC 120 by executing a control program.

A flowchart illustrated in FIG. 4 is started when the information processing apparatus 110 is started. In step S401, the encryption processing unit 209 inquires of the encryption processing unit 217 on the NIC 120 information concerning encryption algorithm and authentication algorithm to be supported by the NIC 120, and acquires these information from the NIC 120. The acquired information is stored in a memory (e.g., RAM 112) in the information processing apparatus 110.

In an example illustrated in FIG. 3, the NIC 120 replies with 3 DES-CBC and AES-CBC as supporting encryption algorithm. Further, the NIC 120 replies with MD 5 and SHA 1 as supporting authentication algorithm.

In step S402, it is determined whether the sleep control unit 205 detects that a condition for shifting the information processing apparatus 110 from the normal power mode to the power saving mode is satisfied. The condition for shifting the information processing apparatus 110 to the power saving mode includes, for example, cases in which a packet addressed to the information processing apparatus 110 itself has not been received from an external device for a predetermined period of time, a user operation has not been performed for a fixed period of time, or a button for shifting the information processing apparatus 110 to the power saving mode is pressed.

When the sleep control unit 205 has detected that the condition for shifting the information processing apparatus 110 to the power saving mode is satisfied (YES in step S402), the sleep control unit 205 notifies the encryption processing unit 209, the proxy response registration unit 204, and the NIC control unit 215 of the fact that the information processing apparatus 110 will be shifted to the power saving mode.

In step S403, the proxy response registration unit 204, which is notified of the shift to the power saving mode, generates a reception packet pattern for specifying a packet to which the NIC 120 is to respond instead of the information processing apparatus 110 and a transmission packet to be transmitted as a response. The proxy response registration unit 204 registers the generated reception packet pattern and the transmission packet with the proxy response pattern DB 214.

FIG. 7 illustrates a pattern for specifying an SNMP request as one example of a reception packet pattern to be registered with the proxy response pattern DB 214. The packet processing unit 216 on the NIC 120 specifies a packet (SNMP request) used to execute a proxy response among packets received from the LAN 160 based on this reception packet pattern.

FIG. 8 illustrates an SNMP reply packet as one example of a transmission packet to be registered with the proxy response pattern DB 214. The packet processing unit 216 on the NIC 120 executes a proxy response by transmitting a packet of the content illustrated in FIG. 8 when it is determined that the SNMP request is received based on the reception packet pattern illustrated in FIG. 7.

Referring to FIG. 4 again, in step S404, the encryption processing unit 209 that is notified of shift to the power saving mode determines whether a session for executing encrypted communication with an external device is established. This determination is executed based on whether security association (SA) information is registered with the encryption key information DB 211.

The communication system 100 is set with security policy information as illustrated in FIG. 9, and this information is stored in the security policy DB 202. The security policy information denotes a security policy defined for the communication system 100.

In the communication system 100, the encryption processing unit 209 negotiates with an external device on the LAN 160. If the session for executing encrypted communication is established, the SA information illustrated in FIG. 10A is registered with the encryption key information DB 211. Then, as time elapses or whenever encrypted communication is executed, the SA information is dynamically updated. FIG. 10A illustrates an example of a state in which the communication system 100 establishes a session for executing encrypted communication with the PCa 301 and the PCb 302, which are external devices.

As a result of determination in step S404, if it is determined that the session for executing encrypted communication with an external device is established (YES in step S404), the processing proceeds to step S405. Otherwise (NO in step S404), the processing proceeds to step S410.

In step S405, the encryption processing unit 209 determines whether the NIC 120 supports algorithms to be used in encrypted communication based on the session that is currently established. This determination is executed by comparing information managed in a table illustrated in FIG. 10A and information acquired from the NIC 120 in step S401.

In other words, in an example illustrated in FIG. 10A, encryption algorithm/authentication algorithm to be used in the session established with the PCa 301 is 3 DES-CBC/SHA 1 respectively. All of these algorithms are supported by the NIC 120. On the other hand, encryption algorithm/authentication algorithm to be used in the session established with the PCb 302 is AES-GCM/SHA 256 respectively. All of these algorithms are not supported by the NIC 120.

Accordingly, in this case, the encryption processing unit 209 determines that the NIC 120 does not support algorithms to be used in the session that is established with the PCb 302.

As a result of determination in step S405, if it is determined that the NIC 120 does not support algorithms to be used in the session that is currently established (NO in step S405), the processing proceeds to step S406. If it is determined that the NIC 120 supports the algorithms (YES in step S405), the processing proceeds to step S409.

In step S406, the encryption processing unit 209 executes processing for changing algorithms to be used in encrypted communication based on the session that has already been established. The detail of the processing in step S406 is illustrated in FIG. 5.

In step S501, the encryption processing unit 209 acquires authentication algorithm set to the session that is determined, in step S405, that the NIC 120 does not support among the SA information stored in the encryption key information DB 211. In an example illustrated in FIG. 10A, the encryption processing unit 209 acquires SHA 256, which is authentication algorithm to be used in the session that is established with the PCb 302.

In step S502, the encryption processing unit 209 determines whether the acquired SHA 256 is an algorithm supported by the NIC 120. In an example illustrated in FIG. 10A, as described above, neither of the encryption algorithm nor the authentication algorithm of the session established with the PCb 302 is not supported by the NIC 120.

However, when the NIC 120 does not support either of encryption algorithm and authentication algorithm, in step S405, negative determination is provided. The processing proceeds to step S406 (step S501). Thus, in step S502, it is determined again whether the NIC 120 supports the acquired authentication algorithm.

In the communication system 100, authentication algorithms supported by the NIC 120 are MD 5 and SHA 1. Thus, the NIC 120 does not support SHA 256 (NO in step S502). Accordingly, in this case, the processing proceeds to step S504. The encryption processing unit 209 determines that authentication algorithms to be proposed to the PCb 302 are MD 5 and SHA 1, which are supported by the NIC 120.

If the NIC 120 supports SHA 256 (YES in step S502), the processing proceeds to step S503. Then, the encryption processing unit 209 determines that authentication algorithm to be proposed to the PCb 302 is SHA 256 that is set in the SA information.

In steps S505 to S508, processing similar to that executed in steps S502 to S504 is executed to encryption algorithm. In step S505, the encryption processing unit 209 acquires encryption algorithm that is set to the session that is determined, in step S405, that the NIC 120 does not support from among the SA information to be stored in the encryption key information DB 211. In an example illustrated in FIG. 10A, the encryption processing unit 209 acquires AES-GCM, which is the encryption algorithm to be used in the session that is established with the PCb 302.

In step S506, the encryption processing unit 209 determines whether the acquired AES-GCM is an algorithm supported by the NIC 120. In the communication system 100, encryption algorithms supported by the NIC 120 are 3 DES-CBC and AES-CBC. Thus, the NIC 120 does not support AES-GCM (NO in step S506). Thus, in this case, the processing proceeds to step S508. The encryption processing unit 209 determines that encryption algorithms to be proposed to the PCb 302 are 3 DES-CBC and AES-CBC, which are supported by the NIC 120.

If the NIC 120 supports AES-GCM (YES in step S506), the processing proceeds to step S507. The encryption processing unit 209 determines that encryption algorithm to be proposed to the PCb 302 is AES-GCM that is set to the SA information.

After algorithm to be proposed to an external device (PCb 302) is determined, in step S509, the encryption processing unit 209 transmits an algorithm change request packet illustrated in FIG. 11 to an external device. All combinations of authentication algorithm and encryption algorithm supported by the NIC 120 are proposed.

A key length of AES-CBC is fixed by 128 bits. However, the key length of 192 bits or 256 bits may be adopted as an option. Further, as illustrated in FIG. 11, in the order of priority of combinations a pair of AES-CBC and SHA 1 is provided at the highest rank. However, a system may exchange the order of priority in arbitrary order. Further, it may be provided so as to allow a user to select the order of priority. In this example, a high priority is assigned in order of high security strength.

The external device (PCb 302) can select arbitrary combinations among the proposed combinations. However, in the present exemplary embodiment, a combination of AES-CBC and SHA 1 is selected. As a result, a new session is established by the changed algorithm and, as illustrated in FIG. 10B, the SA information is updated.

Further, if the encryption processing unit 209 has established a session for executing the encrypted communication with the external device (PCb 302) using AES-CBC and SHA 256, the encryption processing unit 209 transmits an algorithm change packet illustrated in FIG. 12. In other words, encryption algorithm AES-CBC, which is set to the SA information, is not to be changed since the NIC 120 supports the encryption algorithm AES-CBC, and only the authentication algorithm is requested to be changed.

Also, when the NIC 120 does not support either of encryption algorithm and authentication algorithm, as illustrated in FIG. 11, all combinations of algorithms supported by the NIC 120 may be proposed.

In step S407, the encryption processing unit 209 determines whether an algorithm change request to the external device (PCb 302) is successful. If the algorithm change request is rejected by the external device (PCb 302), the processing may proceed intact without changing algorithm or a request to cancel the session for executing the encrypted communication may be transmitted to execute plain text communication.

In step S408, the encryption processing unit 209 holds the SA information (FIG. 10A) before change in the RAM 112 or the NVRAM 116. The SA information before change is used to execute a change request to restore to algorithm before change after the information processing apparatus 110 is returned from the power saving mode to the normal power mode. In step S409, the encryption processing unit 209 acquires the SA information on the encryption key information DB 211 at that time to transmit it to the security information DB 219.

The encryption processing unit 209 and the proxy response registration unit 204 having completed the shift preparation processing (above-described algorithm change processing) notify the sleep control unit 205 of completion of a series of shift preparation processing. Then, in step S410, the sleep control unit 205 not only notifies the NIC control unit 215 of the shift to the sleep but also issues a command to stop supplying electric power current to the CPU 111, the HDD 114, the NVRAM 116, and the like to cause the information processing apparatus 110 to be shifted to the power saving mode.

In step S411, the sleep control unit 205 determines whether the information processing apparatus 110 has satisfied a condition for returning from the power saving mode. This return condition includes, for example, cases in which a wake on LAN (WOL) packet is received via a network and a sleep return button of the operation unit 130 is pressed.

When the information processing apparatus 110 has satisfied a condition for returning from the power saving mode (YES in step S411), in step S412, the sleep control unit 205 causes the information processing apparatus 110 to be returned to the normal power mode. In other words, the sleep control unit 205 restarts electric power supply to the CPU 111, the HDD 114, the NVRAM 116, and the like.

In step S413, the encryption processing unit 209 determines whether a session for executing the encrypted communication with an external device is established before the information processing apparatus 110 is shifted to the power saving mode. This determination is executed based on the SA information on the encryption key information DB 211.

At this time, the registered content of SA information is as illustrated in FIG. 10B. Thus, the encryption processing unit 209 determines that the session has been established. As a result of determination in step S413, if it is determined that the session is established (YES in step S413), the processing proceeds to step S414. Otherwise (NO in step S413), the processing ends.

In step S414, the encryption processing unit 209 acquires the SA information from the security information DB 219 on the NIC 120. The SA information acquired at this time is the registered content as illustrated in FIG. 10C. If time period of having shifted to the power saving mode is an hour and SNMP communication by the IPsec is generated several times during that time, elapsed time, life-duration bytes, sequence numbers, and the like are updated.

The encryption processing unit 209 updates the SA information illustrated in FIG. 10B that is stored in the encryption key information DB 211 into the acquired SA information illustrated in FIG. 10C. In step S415, the encryption processing unit 209 compares the SA information before shifting to the power saving mode held in step S408 (before change of algorithm) and the updated SA information in FIG. 10C. Then, the encryption processing unit 209 determines whether the algorithm is changed when being shifted to the power saving mode. If the algorithm is changed (YES in step S415), the processing proceeds to step S416. If the algorithm is been changed (NO in step S415), the processing ends.

In step S416, the encryption processing unit 209 transmits a change request packet of algorithm to be used to the external device (PCb 302) based on the SA information before shifting to the power saving mode (before change of algorithm) held in step S408.

Encryption algorithm to be proposed at this time is AES-GCM, and authentication algorithm to be proposed is SHA 256. The external device (PCb 302) supports the proposed algorithm. Thus, the change of algorithm is successful and the SA information is updated as illustrated in FIG. 10D.

Next, an operation on the NIC 120 side will be described referring to a flowchart illustrated in FIG. 6. In step S601, it is determined whether the NIC control unit 215 receives proxy response information from the proxy response registration unit 204 on the information processing apparatus 110. If the proxy response information is received (YES in step S601), the processing proceeds to step S602 and stores the received proxy response information in the proxy response pattern DB 214.

In step S603, the NIC control unit 215 determines whether the SA information is transmitted from the encryption processing unit 209 on the information processing apparatus 110. If the SA information is transmitted (YES in step S603), in step S604, the received SA information is stored in the security information DB 219. If the information processing apparatus 110 does not establish a session for executing the encrypted communication with an external device (NO in step S603), the SA information is not transmitted. Thus, processing in step S604 is omitted. Then, the processing proceeds to step S605.

In step S605, the NIC control unit 215 determines whether the shift to the power saving mode is notified from the sleep control unit 205. If the notification is received (YES in step S605), the processing proceeds to step S606 and makes a proxy response function of the NIC 120 effective (ON).

In a case of a state in which the proxy response function is made ineffective (OFF), the packet processing unit 216 on the NIC 120 transfers all of packets received from the LAN 160 to the information processing apparatus 110. On the other hand, in a case of a state in which the proxy response function is made effective (ON), the packet processing unit 216 executes pattern matching to the received packet, and determines whether the packet uses proxy response and whether the packet uses encryption and decryption.

In step S607, the packet processing unit 216 determines whether a packet is received from the LAN 160. If a packet is received (YES in step S607), the processing proceeds to step S608. Otherwise (NO in step S607) the processing stands by until a packet is received.

In step S608, the packet processing unit 216 determines whether the received packet is encrypted. For example, in the IPsec, whether the packet is encrypted can be determined by a protocol field value on an IP header. In an encapsulating security payload (ESP) packet, identification data (ID) on a protocol number 50 (0x32) is stored in this field. In an authentication header (AH) packet, ID on a protocol number (0x33) is stored therein.

If the packet processing unit 216 has determined that the received data is encrypted (YES in step S608), the packet processing unit 216 transfers the received packet to the encryption processing unit 217. Then, the processing proceeds to step S609.

In step S609, the encryption processing unit 217 determines whether the received packet, which is encrypted, matches the SA information (FIG. 10B) stored in the security information DB 219. More specifically, the encryption processing unit 217 refers to a transmission source address, a destination address, a transmission source port number, and a destination port number. If the SA information consistent therewith is present, the encryption processing unit 217 determines that the received packet has matched.

In step S610, the encryption processing unit 217 decrypts packet data based on key information and algorithm set to the SA information that is consistent therewith. After decryption is completed, the encryption processing unit 217 transfers decrypted plain text data to the packet processing unit 216. Further, sequence numbers, life-duration bytes, and the like of the SA information stored in the security information DB 219 are updated.

In step S611, the packet processing unit 216 determines whether the received packet matches a packet pattern that uses a proxy response. In the present exemplary embodiment, if the received pattern matches any one packet pattern registered with the proxy response pattern DB 214, the packet processing unit 216 determines that a proxy response is to be executed. When it is determined that the proxy response is to be executed (YES in step S611), since a packet is to be transmitted by a proxy response is associated and registered therewith, the processing proceeds to step S612. In order to execute transmission preparation of the packet, the packet processing unit 216 transfers the packet to be transmitted to the encryption processing unit 217.

In step S612, the encryption processing unit 217 determines whether the packet is to be encrypted. More specifically, the encryption processing unit 217 refers to a transmission source address, a destination address, a transmission source port number, and a destination port number. If the SA information consistent therewith is present, the encryption processing unit 217 determines that the packet is to be encrypted. If it is determined that the packet is to be encrypted (YES in step S612), the processing proceeds to step S613. The encryption processing unit 217 executes encryption of the packet based on key information and algorithm of the SA information consistent therewith.

After encryption of the packet is completed, the encryption processing unit 217 transfers the encrypted packet to the packet processing unit 216. When it is not used to encrypt the packet, the processing in step S613 is omitted. The encryption processing unit 217 transfers the packet to the packet processing unit 216 as a plain text.

In step S614, the packet processing unit 216 transmits proxy response packet data. Then, the processing returns to step S607 to wait for a packet data to be received. On the other hand, if it is determined that a proxy response is not to be executed (NO in step S611), the processing proceeds to step S615. In step S615, the packet processing unit 216 determines whether the received packet corresponds to the WOL packet.

Whether the received packet corresponds to the WOL packet is determined based on whether the received packet is consistent with a packet pattern that is registered in advance, similar to the proxy response information. If it is determined that the received packet does not correspond to the WOL packet (NO in step S615), after the received packet is cancelled, the processing returns to step S607 and waits for a packet data to be received.

If it is determined that the received packet corresponds to the WOL packet (YES in step S615), the packet processing unit 216 notifies the NIC control unit 215 of the determination result. In step S616, the NIC control unit 215 instructs the sleep control unit 205 on the information processing apparatus 110 to return to the normal power mode. Further, in step S617, the proxy response function of the NIC 120 is made ineffective (OFF). In other words, all of packets received from the LAN 160 thereafter are transferred to the information processing apparatus 110. In step S618, the packet processing unit 216 transfers the received WOL packet to the information processing apparatus 110. Then, the processing ends.

Thus, when the information processing apparatus 110 is shifted to the power saving mode when a session for executing the encrypted communication with an external device is established, the algorithm to be used in the encrypted communication can be changed to the algorithm included in the network interface device.

After the information processing apparatus is shifted to the power saving mode, a packet encrypted using algorithm included in the network interface device is transmitted. Thus, the network interface device can decrypt this packet. Then, by comparing the decrypted packet and a pattern registered as the proxy response information, it is possible to determine whether the network interface device is to respond instead of the information processing apparatus.

In other words, even if the encrypted packet is transmitted from an external device, the network interface device can execute a proxy response. Thus, the number of times, in which the information processing apparatus is returned to the normal power mode, can be reduced.

In the present exemplary embodiment, the IPsec has been described as an example of the encrypted communication. However, the encrypted communication technique can be used without limiting a protocol to secure sockets layer (SSL), and transport layer security (TLS), Institute of Electrical and Electronics Engineers (IEEE) 802.1X, secure shell (SSH), and media access control (MAC) address security. Further, the encrypted communication technique can be applied without limiting to specific encryption algorithms and authentication algorithms.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-060684 filed Mar. 13, 2009, which is hereby incorporated by reference herein in its entirety.

What is claimed is:

1. An information processing apparatus being able to communicate with an external device via a network interface device, comprising:
a processor; and
a memory coupled to the processor, the memory having instructions that, when executed by the processor, perform operations comprising:
detecting that a condition for shifting to a power saving mode, in which power consumption is smaller than that in a normal power mode, is satisfied while the information processing apparatus is operated in the normal power mode, wherein the network interface device executes response processing to a packet received from the external device when the information processing apparatus is in the power saving mode;
determining a first encrypted algorithm which is executed by the network interface device; and
requesting the external device to change a second encrypted algorithm used for a communication between the information processing apparatus and the external device to the first encrypted algorithm when the detecting detects that the condition is satisfied;
determining whether the network interface device can execute the second encrypted algorithm,
wherein when the network interface device cannot execute the second encrypted algorithm, the requesting requests the external device to change the second encrypted algorithm to the first encrypted algorithm determined, and
wherein when the network interface device can execute the second encrypted algorithm, the requesting does not request the external device to change the second encrypted algorithm.

2. The information processing apparatus according to claim 1, further comprising determining whether the network interface device can execute the second encrypted algorithm,
wherein when it is determined that the network interface device cannot execute the second encrypted algorithm, the requesting requests the external device to change the second encrypted algorithm to the first encrypted algorithm determined, and
wherein when it is determined that the network interface device can execute the second encrypted algorithm, the requesting does not request the external device to change the second encrypted algorithm.

3. The information processing apparatus according to claim 1, further comprising acquiring information indicating the first encrypted algorithm from the network interface device, wherein the determining the first encrypted algorithm executes the determination based on the acquired information.

4. The information processing apparatus according to claim 1, further comprising:
holding, when the second encrypted algorithm is changed to the first encrypted algorithm, information related to the second encrypted algorithm before the change.

5. The information processing apparatus according to claim 4, wherein the requesting requests the external device to change the first encrypted algorithm to the second encrypted algorithm based on the information held by the holding unit when the information processing apparatus shifts from the power saving mode to the normal power mode.

6. The information processing apparatus according to claim 1, further comprising:
notifying the network interface device of information concerning a session being established between the information processing apparatus and the external device when the information processing apparatus shifts from the normal power mode to the power saving mode.

7. The information processing apparatus according to claim 1, wherein the communication executed between the information processing apparatus and the network interface device is a communication using IPsec.

8. A method for an information processing apparatus being able to communicate with an external device via a network interface device, the method comprising:
detecting that a condition for shifting to a power saving mode, in which power consumption is smaller than that in a normal power mode, is satisfied while the information processing apparatus is operated in the normal power mode,
wherein the network interface device executes response processing to a packet received from the external device when the information processing apparatus is in the power saving mode;
determining a first encrypted algorithm which is executed by the network interface device;
requesting the external device to change a second encrypted algorithm used for a communication between the information processing apparatus and the external device to the first encrypted algorithm when the detecting detects that the condition is satisfied the condition is satisfied; and determining whether the network interface device can execute the second encrypted algorithm,
wherein when the network interface device cannot execute the second encrypted algorithm, the requesting requests the external device to change the second encrypted algorithm to the first encrypted algorithm determined, and
wherein when the network interface device can execute the second encrypted algorithm, the requesting does not request the external device to change the second encrypted algorithm.

9. The method according to claim 8, further comprising acquiring information indicating the first encrypted algorithm from the network interface device,
wherein the determining the first encrypted algorithm executes the determination based on the acquired information.

10. The method according to claim 8, further comprising: holding, when the second encrypted algorithm is changed to the first encrypted algorithm, information related to the second encrypted algorithm before the change.

11. The method according to claim 10, wherein the requesting requests the external device to change the first encrypted algorithm to the second encrypted algorithm based on the information held by the holding unit when the information processing apparatus shifts from the power saving mode to the normal power mode.

12. The method according to claim 8, further comprising: notifying the network interface device of information concerning a session being established between the information processing apparatus and the external device when the information processing apparatus shifts from the normal power mode to the power saving mode.

13. The method according to claim 8, wherein the communication executed between the information processing apparatus and the network interface device is a communication using IPsec.

14. A non-transitory computer-readable storage medium storing a program for causing a computer to execute a method for an information processing apparatus being able to communicate with an external device via a network interface device comprising:
    detecting that a condition for shifting to a power saving mode, in which power consumption is smaller than that in a normal power mode, is satisfied while the information processing apparatus is operated in the normal power mode,
        wherein the network interface device executes response processing to a packet received from the external device when the information processing apparatus is in the power saving mode;
        determining a first encrypted algorithm which is executed by the network interface device;
        requesting the external device to change a second encrypted algorithm used for a communication between the information processing apparatus and the external device to the first encrypted algorithm when the detecting detects that the condition is satisfied the condition is satisfied; and
    determining whether the network interface device can execute the second encrypted algorithm,
        wherein when the network interface device cannot execute the second encrypted algorithm, the requesting requests the external device to change the second encrypted algorithm to the first encrypted algorithm determined, and
        wherein when the network interface device can execute the second encrypted algorithm, the requesting does not request the external device to change the second encrypted algorithm.

15. The non-transitory computer-readable storage medium according to claim 14, further comprising: determining whether the network interface device can execute a second encrypted algorithm,
    wherein when the determining determines that the network interface device cannot execute second encrypted algorithm, requesting the external device to change the second encrypted algorithm to the first encrypted algorithm;
    wherein when the determining determines that the network interface device can execute the second encrypted algorithm, the requesting does not request the external device to change the second encrypted algorithm.

16. The non-transitory computer-readable storage medium according to claim 14, further comprising:
    holding, when the second encrypted algorithm is changed to the first encrypted algorithm, information related to the second encrypted algorithm before the change.

17. The non-transitory computer-readable storage medium according to claim 14, further comprising:
    notifying the network interface device of information concerning a session being established for between the information processing apparatus and the external device when the information processing apparatus shifts from the normal power mode to the power saving mode.

18. The non-transitory computer-readable storage medium according to claim 14, further comprising acquiring information indicating the first encrypted algorithm from the network interface device,
    wherein the determining the first encrypted algorithm executes the determination based on the acquired information.

19. The non-transitory computer-readable storage medium according to claim 16, wherein the requesting requests the external device to change the first encrypted algorithm to the second encrypted algorithm based on the held information when the information processing apparatus shifts from the power saving mode to the normal power mode.

20. The non-transitory computer-readable storage medium according to claim 14, wherein the communication executed between the information processing apparatus and the network interface device is a communication using IPsec.

* * * * *